United States Patent Office 3,644,364
Patented Feb. 22, 1972

3,644,364
COMPOUNDS AND PROCESS
William Crawford Anthony, Kalamazoo, Mich., assignor to The Upjohn Company, Kalamazoo, Mich.
No Drawing. Filed Mar. 31, 1970, Ser. No. 24,351
Int. Cl. C07d 51/34
U.S. Cl. 260—256.4 H
3 Claims

ABSTRACT OF THE DISCLOSURE

Process for the preparation of 6-substituted-4-amino-1,2-dihydro-1-hydroxy-2-iminopyrimidines and 6-substituted-4-halo-1,2-dihydro-1-hydroxy-2-iminopyrimidines utilized as intermediates in said process. The 6-substituted-4-amino-1,2-dihydro-1-hydroxy-2-iminopyrimidines prepared by said process are useful as antihypertensive agents.

BRIEF SUMMARY OF THE INVENTION

The novel process of this invention is illustrated by the following flow scheme.

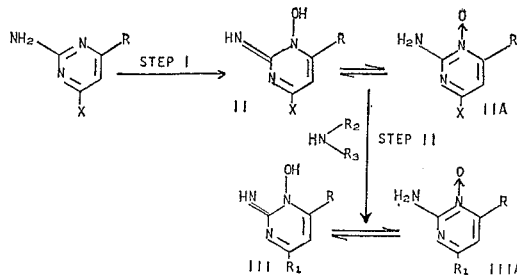

wherein R is selected from the group consisting of —NH$_2$ and alkyl of from 1 to 8 carbon atoms, inclusive, X is selected from the group consisting of bromo and chloro and R$_1$ is a moiety selected from the group consisting of (a) moieties of the formula:

wherein R$_2$ and R$_3$ are selected from the group consisting of hydrogen, alkyl of from 1 to 8 carbon atoms, inclusive, alkenyl of from 1 to 8 carbon atoms, inclusive, unsubstituted and alkyl substituted cycloalkyl of from 3 to 10 carbon atoms, inclusive, phenylalkyl of from 7 to 12 carbon atoms, inclusive, naphthylalkyl off rom 11 to 14 carbon atoms, inclusive, with the proviso that both R$_2$ and R$_3$ are not hydrogen, and (b) the heterocyclic moieties, aziridinyl, azetidinyl, pyrrolidinyl, piperidino, hexahydroazepinyl, heptamethyleneimino, octamethyleneimino, morpholino, 4-alkylpiperazinyl, each of said heterocyclic moieties having attached as substituents on carbon atoms thereof zero to 3 alkyls, inclusive, wherein the alkyl groups, attached to the heterocyclic moieties are of from 1 to 8 carbon atoms, inclusive.

Examples of alkyl of from 1 to 8 carbon atoms, inclusive, are methyl, ethyl, propyl, butyl, pentyl, hexyl, heptyl, octyl, and isomeric forms thereof. Examples of alkenyl of from 1 to 8 carbon atoms, inclusive, are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of unsubstituted and alkyl substituted cycloalkyl of from 3 to 10 carbon atoms, inclusive, are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3-isopropylcyclohexyl, 2,2-dimethylcyclohexyl, cycloheptyl, cyclooctyl, and the like. Examples of phenylalkyl of from 7 to 10 carbon atoms, inclusive, are benzyl, phenethyl, 1-phenylethyl, 2-phenylpropyl, 4-phenylbutyl, 2-phenylbutyl, and 2-phenyl-2-methylpropyl. Examples of naphthylalkyl of from 11 to 14 carbon atoms, inclusive are 1-naphthylmethyl, 2-(1-naphthyl)-ethyl,2-(2-naphthyl)ethyl, and the like.

Examples of heterocyclic moieties within the scope of R$_1$ in addition to those already mentioned above, are 2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-dioctylpyrrolidinyl,
2-methylpiperidino,
4-tert-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl,
4-tert-butylhexahydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-octyloctamethylenimino,
2-ethylmorpholino,
2-methyl-5-ethyl-morpholino,
3,3-dimethylmorpholino,
2,6-ditert-butylmorpholino,
4-methylpiperazinyl,
4-isopropylpiperazinyl, and the like. In each of the above examples of heterocyclic moieties, the free valence, and hence the point of attachment to a carbon atom of the pyrimidine ring, is at the heterocyclic nitrogen atom.

The novel 1,2-dihydro-4-halo-1-hydroxypyrimides (II) and the 1,2-dihydro-1-hydroxypyrimides (III) of this invention can be represented by formulas other than Formula II and III. Compounds of Formulas II–A and III–A are tautomeric with compounds of Formula II and III, respectively. It is to be understood, however, that the novel compounds, II, and the final compounds, III, are likely to be mixtures of tautomeric forms, the composition of which are dependent on such factors as the nature of R, X, and $R_1$, and the environment. In some instances, one form or another may predominate.

The novel intermediates of Formula II are amines, and exist in the non-protonated or free base form, or in the protonated or acid addition salt form, depending on the pH of the environment. They form stable protonates, i.e., mono- or diacid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and the lactic acids, and the like. These acid addition salts are useful for upgrading or purifying the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula II compounds form salts with fluosilicic acid which are useful as mothproofing agents according to U.S. Pats. 1,915,334 and 2,075,359. They also form salts with thiocyanic acid which condense with formaldehyde to form resinous materials useful as pickling inhibitors according to U.S. Pats. 2,425,320 and 2,606,155.

Step 1 of the process involves oxidizing a 6-substituted-4-halopyrimidine I with a peracid to form a 6-substituted-4-halo-1,2-dihydro-1-hydroxy-2-iminopyrimidine II. Step 2 involves reacting compound II with the appropriate amine to form a 6-substituted-4-amino-1,2-dihydro-1-hydroxy-2-iminopyrimidines (III).

DETAILED DESCRIPTION

Step 1 can be conducted at a temperature of −10 to 100° C., preferably at a temperature of 0 to 25° C. and the mole ratio of a perbenzoic acid to I is 5 to 1, preferably 1.5 to 1.

Solvents that can be used include alcohols, such as methanol, ethanol, isopropanol, glycol, and propylene glycol, ethers, such as diethyl ether, methylcellosolve, ethyleneglycol, and ethyenelglycol dimethyl ether; chlorinated hydrocarbons such as chloroform, carbontetrachloride, and ethylene dichloride; hydrocarbons, such as hexane, cyclohexane, benzene, toluene, xylene, and naphthalene; ketones, such as acetone and methylethyl ketone; amides, such as dimethylformamide and dimethylacetamide; and other polar solvents such as dimethylsulfoxide and dimethylsulfone. Also, mixtures of the above solvents can be used.

Suitable oxidizing agents for this step include perbenzoic acid, o-, m-, p-chloro- and bromoperbenzoic acids, 3,5-dichloroperbenzoic acid, 2,3,4,6-tetrachloroperbenzoic acid, 4-methylperbenzoic acid, pentamethylperbenzoic, 3,4-dimethylperbenzoic, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid and o-, m-, p-carboxyperbenzoic acids.

The 6-substituted-4-halopyrimidines I utilized in Step 1 are known in the art or can be prepared by methods known in the art. See for example U.S. Pat. 3,461,461, columns 6, lines 16 to 75 and columns 7, lines 1 to 8 and Braker et al., J. Amer. Chem. Soc., 69,3072 (1947).

Step 2 involves reacting the 6-substituted-4-halo-1,2-dihydro-1-hydroxy-2-iminopyrimidine II formed in Step 1 with an amine having the formula

wherein $R_2$ and $R_3$ are the same as above. The mole ratio of amine to II is 100 to 1, preferably 20 to 1. The reaction temperature can range from 0–200° C., preferably 50°–150° C. In this step, either the amine

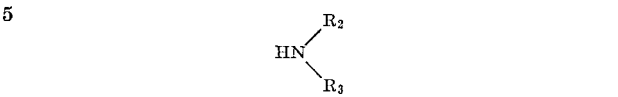

wherein $R_2$ and $R_3$ are the same as above, or any of the solvents utilized in step 1 can be utilized as solvents.

The process of this invention can be used to prepare compounds of Formula III. The compounds of Formula III are useful, inter alia, as antihypertensive agents when administered orally or parenterally to birds and mammals. Compounds of Formula III wherein R is —$NH_2$ are disclosed and claimed in U.S. Pat. 3,461,461. Compounds of Formula III wherein R is an alkyl of from 1 to 8 carbon atoms are disclosed and claimed in U.S. Pat. 3,464,987.

The following examples are set forth to illustrate my invention and to enable people skilled in the art to better understand and practice the invention and are not intended to limit the same.

EXAMPLE 1

6-amino-4-chloro-1,2-dihydro-1-hydroxy-2-iminopyrimidine

A 30 g. (0.15 mole) quantity of 4-chloro-2,6-diaminopyrimidine is dissolved in 600 ml. of hot 3A alcohol, the solution cooled to 0–10° C. and 41.8 g. (0.24 mole) of m-chloroperbenzoic acid is added. The mixture is held at 0–10° C. for 4 hours and filtered. The solid is shaken for 2 hours in 0.24 mole of 10% sodium hydroxide and filtered. The solid is washed with water and dried to yield 19.3 g. of crude product. This product is extracted for 1 hour with 900 ml. of boiling acetonitrile to yield 14.8 g. (44.7% yield) of 6-amino-4-chloro-1,2-dihydro-1-hydroxy-2-imino pyrimidine, M.P. 193° C.

Analysis.—Calcd. for $C_4H_5ClN_4O$ (percent): C, 29.93; H, 3.14; Cl, 22.09; N, 34.90. Found (percent): C, 30.60; H, 3.43; Cl, 22.26; N, 34.41.

Using the procedure described in Example 1 but replacing 4-chloro-2,6-diaminopyrimidine by 4-bromo-2,6-diaminopyrimidine is productive of 6-amino-4-bromo-1,2-dihydro-1-hydroxy-2-iminopyrimidine.

EXAMPLE 2

6-amino-1,2-dihydro-1-hydroxy-2-imino-4-piperidinopyrimidine

A mixture of 3.0 g. (0.019 mole) of 6-amino-4-chloro-1,2-di-dihydro-1-hydroxy-2-iminopyrimidine (Example 1) and 35 ml. of piperidine is refluxed for 1.5 hours, cooled and filtered. The solid is shaken for 20 min. in a solution of 0.8 g. of sodium hydroxide in 30 ml. of water and filtered. The solid is washed with water and extracted with 800 ml. of boiling acetonitrile and filtered to yield 3.5 g. (89% yield) of 6-amino-1,2-dihydro-1-hydroxy-2-imino-4-piperidinopyrimidine, M.P. 248° C. decomposition at 259–261° C.

Analysis.—Calcd. for $C_9H_{15}N_5O$ (percent): C, 51.66; H, 7.22; N, 33.47. Found (percent): C, 51.94; H, 6.87; N, 33.36.

Following the procedure of Example 2 but using in place of the piperidine, dimethylamine; diethylamine; dibutylamine; N-methylbutylamine; N-ethylhexylamine; butylamine; octylamine; diallylamine; dicrtylamine; di-(2 - hexenyl)amine; N-methylallylamine; allylamine; 2-octenylamine; dibenzylamine; diphenethylamine; N-methylbenzylamine; N-ethyl-(1-naphthylmethyl)-amine; benzylamine; 3-phenylpropylamine; cyclohexylamine; dicyclohexylamine; cyclobutylamine; N-methyl-(4 - tert-butylcyclohexyl)amine; azetidine; pyrrolidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine;

morpholine; 2-ethylmorpholine; and N-methylpiperazine, there are obtained 6-amino-1,2-dihydro-4-dimethylamino-1-hydroxy-2-iminopyrimidine;
6-amino-4-diethylamino-1,2-dihydro-1-hydroxy-2-iminopyrimidine;
6-amino-4-dibutylamino-1,2-dihydro-1-hydroxy-2-iminopyrimidine;
6-amino-1,2-dihydro-1-dihydroxy-2-imino-4-(N-methylbutylamino)pyrimidine;
6-amino-1,2-dihydro-4-(N-ethylhexylamino)-1-hydroxy-2-iminopyrimidine;
6-amino-4-butylamino-1,2-dihydro-1-hydroxy-2-iminopyrimidine;
6-amino-1,2-dihydro-1-hydroxy-2-imino-4-octylaminopyrimidine;
6-amino-4-diallylamino-1,2-dihydro-1-hydroxy-2-iminopyrimidine;
6-amino-4-dicrotylamino-1,2-dihydro-1-hydroxy-2-iminopyrimidine;
6-amino-4-[di-(2-hexenyl)amino]-1,2-dihydro-1-hydroxy-2-iminopyrimidine;
6-amino-1,2-dihydro-1-hydroxy-2-imino-4-(N-methylallylamino)pyrimidine;
4-allylamino-6-amino-1,2-dihydro-1-hydroxy-2-iminopyrimidine;
6-amino-1,2-dihydro-1-hydroxy-2-imino-4-(2-octenylamino)pyrimidine;
6-amino-4-dibenzylamino-1,2-dihydro-1-hydroxy-2-iminopyrimidine;
6-amino-1,2-dihydro-4-diphenethylamino-1-hydroxy-2-iminopyrimidine;
6-amino-1,2-dihydro-1-hydroxy-2-imino-4-(N-methylbenzylamino)pyrimidine;
6-amino-1,2-dihydro-4-[N-ethyl-(1-naphthylmethyl)-amino]-1-hydroxy-2-iminopyrimidine;
6-amino-4-benzylamino-1,2-dihydro-1-hydroxy-2-iminopyrimidine;
6-amino-1,2-dihydro-1-hydroxy-2-imino-4-(3-phenylpropylamino)pyrimidine;
6-amino-4-cyclohexylamino-1,2-dihydro-1-hydroxy-2-iminopyrimidine;
6-amino-4-dicyclohexylamino-1,2-dihydro-1-hydroxy-2-iminopyrimidine;
6-amino-4-cyclobutylamino-1,2-dihydro-1-hydroxy-2-iminopyrimidine;
6-amino-1,2-dihydro-1-hydroxy-2-imino-4-[N-methyl-(4-tert-butylcyclohexyl)amino]pyrimidine;
6-amino-4-(1-azetidinyl)-1,2-dihydro-1-hydroxy-2-iminopyrimidine;
6-amino-1,2-dihydro-1-hydroxy-2-imino-4-(1-pyrrolidinyl)pyrimidine;
6-amino-1,2-dihydro-1hydroxy-2-imino-4-[1-(2-methylpyrrolidinyl)]pyrimidine;
6-amino-1,2-dihydro-4-[1-(3-ethylpyrrolidinyl)]-1-hydroxy-2-iminopyrimidine;
6-amino-1,2-dihydro-4-[1-(2,5-dimethylpyrrolidinyl)]-1-hydroxy-2-iminopyrimidine;
6-amino-1,2-dihydro-1-hydroxy-2-imino-4-(2-methyl-5-ethylpiperidino)pyrimidine;
6-amino-1,2-dihydro-1-hydroxy-2-imino-4-(3-isopropylpiperidino)pyrimidine;
6-amino-1,2-dihydro-1-hydroxy-2-imino-4-(2,4,6-trimethylpiperidino)pyrimidine;
6-amino-1,2-dihydro-4-(1-hexahydroazepinyl)-1-hydroxy-2-iminopyrimidine;
6-amino-4-[1-(4-tert-butylhexahydroazepinyl)]-1,2-dihydro-1-hydroxy-2-iminopyrimidine;
6-amino-1,2-dihydro-4-(1-heptamethylenimino)-1-hydroxy-2-iminopyrimidine;
6-amino-1,2-dihydro-1-hydroxy-2-imino-4-(1-octamethylenimino)pyrimidine;
6-amino-1,2-dihydro-1-hydroxy-2-imino-4-morpholinopyrimidine;
6-amino-1,2-dihydro-4-(2-ethylmorpholino)-1-hydroxy-2-iminopyrimidine; and
6-amino-1,2-dihydro-1-hydroxy-2-imino-4-(4-methyl-1-piperazinyl)pyrimidine, respectively.

EXAMPLE 3

4-chloro-1,2-dihydro-1-hydroxy-2-imino-6-methylpyrimidine

A mixture of 30 g. (0.208 mole) of 2-amino-4-chloro-6-methylpyrimidine and 800 ml. of alcohol is refluxed until a clear solution is formed. The solution is cooled to 5° C. and 40 g. (0.23 mole) of m-chloroperbenzoic acid is added. The mixture is stirred at 0–10° C. for 4 hours and filtered. The filtrate is allowed to stand for 20 hours and filtered. The solid from this last filtration is recrystallized from acetonitrile to yield 2.6 g. of 4-chloro-1,2-dihydro-1-hydroxy-2-imino-6-methylpyrimidine, M.P. rapid decomposition at 161° C.

Analysis.—Calcd. for $C_5H_6ClN_3O$ (percent): C, 37.63; H, 3.79; Cl, 22.22; N, 26.33. Found (percent): C, 37.64; H, 4.09; Cl, 23.20; N, 26.11.

Using the procedure described in Example 3 but replacing 2-amino-4-chloro-6-methylpyrimidine by 2-amino-4-bromo-6-methyl-pyrimidine is productive of 4-bromo-1,2-dihydro-1-hydroxy-2-imino-6-methyl pyrimidine.

Also using the procedure described in Example 3, but replacing 2-amino-4-chloro-6-methylpyrimidine by the appropriate 2-amino-4-chloro-6-alkylpyrimidine is productive of the corresponding 4-chloro-1,2-dihydro-1-hydroxy-2-imino-6-alkylpyrimidine. Representative of the 2-amino-4-chloro-6-alkylpyrimidines so obtained are:

4-chloro-1,2-dihydro-1-hydroxy-2-imino-6-ethylpyrimidine
4-chloro-1,2-dihydro-1-hydroxy-2-imino-6-propylpyrimidine
4-chloro-1,2-dihydro-1-hydroxy-2-imino-6-isopropylpyrimidine
4-chloro-1,2-dihydro-1-hydroxy-2-imino-6-isobutylpyrimidine
4-chloro-1,2-dihydro-1-hydroxy-2-imino-6-pentylpyrimidine
4-chloro-1,2-dihydro-1-hydroxy-2-imino-6-hexylpyrimidine
4-chloro-1,2-dihydro-1-hydroxy-2-imino-6-heptylpyrimidine and
4-chloro-1,2-dihydro-1-hydroxy-2-imino-6-octylpyrimidine.

EXAMPLE 4

1,2-dihydro-1-hydroxy-2-imino-6-methyl-4-pyrrolidylpyrimidine

A mixture of 10.0 g. (0.062 mole) of 4-chloro-1,2-dihydro-1-hydroxy-2-imino-6-methylpyrimidine (Example 1) and 70 ml. of pyrrolidine is refluxed for 2 hours, cooled and filtered. The solid is washed successively with pyrrolidine and ether and then extracted with 300 ml. of acetonitrite to yield 9.5 g. (82%) of 1,2-dihydro-1-hydroxy-2-imino-6-methyl - 4 - pyrrolidylpyrimidine, M.P. 271–273° C.

Analysis.—Calcd. for $C_9H_{14}N_4O$ (percent): C, 55.65; H, 7.26; N, 28.84; O, 8.24. Found (percent): C, 55.27; H, 7.19; N, 28.07; O, 6.59.

Following the procedure of Example 4 but using in place of the pyrrolidine the piperidine, dimethylamine; diethylamine; dibutylamine; N-methylbutylamine; N-ethylhexylamine; butylamine; octylamine; diallylamine; dicrotylamine; di-(2-hexenyl)amine; N-methylallylamine; allylamine; 2-octenylamine; dibenzylamine; diphenethylamine; N - methylbenzylamine; N-ethyl-(1-naphthylmethyl)-amine; benzylamine; 3 - phenylpropylamine; cyclohexylamine; dicyclohexylamine; cyclobutylamine; N-methyl-(4-tert-butylcyclohexyl)amine; azetidine; pyrrolidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and N-methylpiperazine, there are obtained 6-octyl-1,2-dihydro-1-hydroxy-2-imino-4-piperidinopyrimidine;
6-methyl-1,2-dihydro-4-dimethylamino-1-hydroxy-2-iminopyrimidine;
6-methyl-4-diethylamino-1,2-dihydro-1-hydroxy-2-iminopyrimidine;
6-ethyl-4-dibutylamino-1,2-dihydro-1-hydroxy-2-iminopyrimidine;
6-propyl-1,2-dihydro-1-hydroxy-2-imino-4-(N-methylbutylamino)pyrimidine;
6-isopropyl-1,2-dihydro-4-(N-ethylhexylamino)-1-hydroxy-2-iminopyrimidine;
6-methyl-4-butylamino-1,2-dihydro-1-hydroxy-2-iminopyrimidine;
6-butyl-1,2-dihydro-1-hydroxy-2-imino-4-octylaminopyrimidine;
6-isobutyl-4-diallylamino-1,2-dihydro-1-hydroxy-2-iminopyrimidine;
6-pentyl-4-dicrotylamino-1,2-dihydro-1-hydroxy-2-iminopyrimidine;
6-hexyl-4-[di-2-(hexenyl)amino]-1,2-dihydro-1-hydroxy-2-iminopyrimidine;
6-heptyl-1,2-dihydro-1-hydroxy-2-imino-4-(N-methylallylamino)pyrimidine;
4-allylamino-6-methyl-1,2-dihydro-1-hydroxy-2-iminopyrimidine;
6-methyl-1,2-dihydro-1-hydroxy-2-imino-4-(2-octenylamino)pyrimidine;
6-methyl-4-dibenzylamino-1,2-dihydro-1-hydroxy-2-iminopyrimidine;
6-methyl-1,2-dihydro-4-diphenethylamino-1-hydroxy-2-iminopyrimidine;
6-methyl-1,2-dihydro-1-hydroxy-2-imino-4-(N-methylbenzylamino)pyrimidine;
6-methyl-1,2-dihydro-4-[N-ethyl-(1-naphthylmethyl)amino]-1-hydroxy-2-iminopyrimidine;
6-methyl-4-benzylamino-1,2-dihydro-1-hydroxy-2-iminopyrimidine;
6-methyl-1,2-dihydro-1-hydroxy-2-imino-4-(3-phenylpropylamino)pyrimidine;
6-methyl-4-cyclohexylamino-1,2-dihydro-1-hydroxy-2-iminopyrimidine;
6-methyl-4-dicyclohexylamino-1,2-dihydro-1-hydroxy-2-iminopyrimidine;
6-methyl-4-cyclobutylamino-1,2-dihydro-1-hydroxy-2-iminopyrimidine;
6-methyl-1,2-dihydro-1-hydroxy-2-imino-4-[N-methyl-(4-tert-butylcyclohexyl)amino]pyrimidine;
6-methyl-4-(1-azetidinyl)-1,2-dihydro-1-hydroxy-2-iminopyrimidine;
6-methyl-1,2-dihydro-1-hydroxy-2-imino-4-(1-pyrrolidinyl)pyrimidine;
6-methyl-1,2-dihydro-1-hydroxy-2-imino-4-[1-(2-methylpyrrolidinyl)]pyrimidine;
6-methyl-1,2-dihydro-4-[1-(3-ethylpyrrolidinyl)]-1-hydroxy-2-iminopyrimidine;
6-methyl-1,2-dihydro-4-[1-(2,5-dimethylpyrrolidinyl)]-1-hydroxy-2-iminopyrimidine;
6-methyl-1,2-dihydro-1-hydroxy-2-imino-4-(2-methyl-5-ethylpiperidino)-pyrimidine;
6-methyl-1,2-dihydro-1-hydroxy-2-imino-4-(3-isopropylpiperidino)pyrimidine;
6-methyl-1,2-dihydro-1-hydroxy-2-imino-4-(2,4,6-trimethylpiperidino)pyrimidine;
6-methyl-1,2-dihydro-4-(1-hexahydroazepinyl)-1-hydroxy-2-iminopyrimidine;
6-methyl-4-[1-(4-tert-butylhexahydroazepinyl)]-1,2-dihydro-1-hydroxy-2-iminopyrimidine;
6-methyl-1,2-dihydro-4-(1-heptamethylenimino)-1-hydroxy-2-iminopyrimidine;
6-methyl-1,2-dihydro-1-hydroxy-2-imino-4-(1-octamethyleneimino)pyrimidine;
6-methyl-1,2-dihydro-1-hydroxy-2-imino-4-morpholinopyrimidine;
6-methyl-1,2-dihydro-4-(2-ethylmorpholino)-1-hydroxy-2-iminopyrimidine; and
6-methyl-1,2-dihydro-1-hydroxy-2-imino-4-(4-methyl-1-piperazinyl)pyrimidine, respectively.

I claim:
1. A compound having the formula:

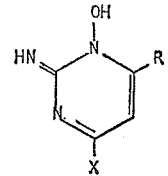

wherein R is selected from the group consisting of alkyl of from 1 to 8 carbon atoms, inclusive, and —NH$_2$; and X is selected from the group consisting of bromo and chloro.

2. A compound of claim 1 wherein R is —NH$_2$ and X is chloro.

3. A compound of claim 1 wherein R is —CH$_3$ and X is chloro.

References Cited
UNITED STATES PATENTS 3,382,247   5/1968   Anthony et al. _____ 260—256.4 H ALEX MAZEL, Primary Examiner R. J. GALLAGHER, Assistant Examiner U.S. Cl. X.R.

260—247.5, 256.5 R, 256.4 N, 999

UNITED STATES PATENT OFFICE
CERTIFICATE OF CORRECTION

Patent No. 3,644,364  Dated February 22, 1972

Inventor(s) William Crawford Anthony

It is certified that error appears in the above-identified patent and that said Letters Patent are hereby corrected as shown below:

Column 1, line 26, for " " read --- I ---.  Column 4, line 65, for "dicrtylamine" read ---dicrotylamine---.

Column 5, line 54, for "1hydroxy" read --- 1-hydroxy ---.

Column 8, line 51, for "3,382,3447" read --- 3,382,247 ---.

Signed and sealed this 27th day of March 1973.

(SEAL)
Attest:

EDWARD M. FLETCHER, JR.  
Attesting Officer

ROBERT GOTTSCHALK  
Commissioner of Patents